(12) United States Patent
Manabe et al.

(10) Patent No.: US 8,048,580 B2
(45) Date of Patent: Nov. 1, 2011

(54) FUEL CELL SYSTEM WITH AN OXIDATION GAS FLOW CONTROLLER

(75) Inventors: Kota Manabe, Toyota (JP); Hiroyuki Imanishi, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 406 days.

(21) Appl. No.: 12/447,706

(22) PCT Filed: Mar. 10, 2008

(86) PCT No.: PCT/JP2008/054829
§ 371 (c)(1),
(2), (4) Date: Apr. 29, 2009

(87) PCT Pub. No.: WO2008/114759
PCT Pub. Date: Sep. 25, 2008

(65) Prior Publication Data
US 2010/0068575 A1    Mar. 18, 2010

(30) Foreign Application Priority Data
Mar. 12, 2007    (JP) ................................ 2007-061822

(51) Int. Cl.
*H01M 8/04* (2006.01)
(52) U.S. Cl. ...................................... 429/429; 429/444
(58) Field of Classification Search ................ 429/410, 429/422, 429–432, 444; 180/65.1
See application file for complete search history.

(56) References Cited

U.S. PATENT DOCUMENTS

| | | | |
|---|---|---|---|
| 6,185,100 B1* | 2/2001 | Bentz et al. | 361/704 |
| 7,083,017 B2* | 8/2006 | Hasuka et al. | 180/65.1 |
| 2001/0051291 A1* | 12/2001 | Aoyagi et al. | 429/23 |
| 2002/0110710 A1 | 8/2002 | Keskula | |
| 2002/0114986 A1* | 8/2002 | Aoyagi et al. | 429/23 |
| 2003/0008185 A1* | 1/2003 | Sugino et al. | 429/13 |
| 2008/0145714 A1* | 6/2008 | Kagami | 429/13 |
| 2010/0203409 A1* | 8/2010 | Manabe et al. | 429/431 |

FOREIGN PATENT DOCUMENTS

| | | |
|---|---|---|
| CN | 201112486 Y | 9/2008 |
| JP | 3-141560 A | 6/1991 |
| JP | 2004-030979 A | 1/2004 |
| JP | 2005-197030 A | 7/2005 |
| JP | 2005-327584 A | 11/2005 |
| JP | 2005-332702 A | 12/2005 |

* cited by examiner

*Primary Examiner* — Chandrika Prasad
(74) *Attorney, Agent, or Firm* — Kenyon & Kenyon LLP (57) ABSTRACT

A fuel cell system includes: a fuel cell stack which receives a fuel gas and an oxidation gas to generate a power; an air compressor which supplies the oxidation gas to the fuel cell stack; and a controller which reduces the oxidation gas flow rate supplied from the air compressor to the fuel cell stack in consideration of discharge from a capacitance component of the fuel cell stack when decreasing the output voltage of the fuel cell stack. When the output voltage of the fuel cell stack has dropped, the fuel cell system can control a cell operation in consideration of the discharge from the capacitance component of the fuel cell stack to an external load.

6 Claims, 4 Drawing Sheets

FUEL CELL SYSTEM WITH AN OXIDATION GAS FLOW CONTROLLER

This is a 371 national phase application of PCT/JP2008/054829 filed 10 Mar. 2008, which claims priority to Japanese Patent Application No. 2007-061822 filed 12 Mar. 2007, the contents of which are incorporated herein by reference.

TECHNICAL FIELD

The present invention relates to a fuel cell system which controls an operation in consideration of discharge from a capacitance component of a fuel cell when decreasing the output voltage of the fuel cell.

BACKGROUND ART

A fuel cell is a power generation system which oxidizes a fuel by an electrochemical process to directly convert energy discharged by an oxidizing reaction into electric energy, and the system has a stack structure in which a plurality of membrane-electrode assemblies are stacked. In each assembly, both side surfaces of an electrolytic film for selectively transporting hydrogen ions are sandwiched between a pair of electrodes made of a porous material. Above all, a solid polymer electrolyte type fuel cell in which a solid polymer film is used as an electrolyte can easily be made compact at a low cost, and additionally it has a high output density. In consequence, the use application of the fuel cell as a car-mounted power source is expected.

In this type of fuel cell, a range of 70 to 80° C. is usually considered to be an optimum temperature range for power generation, but in an environment of a cold district or another place, a long time is sometimes required from a time when the fuel cell starts to a time when the optimum temperature range is reached, and hence various types of warm-up systems have been investigated. For example, in Japanese Patent Application Laid-Open No. 2004-30979, a technique is disclosed which controls the self-heating amount of the fuel cell by operation at a low power generation efficiency as compared to a normal, to warm up the fuel cell. According to such a technique, the self-warm-up by the fuel cell is possible. Therefore, any device for the warm-up does not have to be mounted, and the technique is excellent in convenience.

[Patent Document 1] Japanese Patent Application Laid-Open No. 2004-30979

DISCLOSURE OF THE INVENTION

Meanwhile, when a demanded power to a fuel cell decreases during a low-efficiency operation, an air flow rate from an air compressor to the fuel cell cannot rapidly be reduced, so that an excessive power in excess of a generation instruction value is sometimes generated. When the output voltage of the fuel cell is temporarily increased, a capacitance component of the fuel cell can be charged with such an excessive power.

Moreover, after charging the capacitance component of the fuel cell with the excessive power, the output voltage of the fuel cell needs to be decreased to an original voltage. When the output voltage of the fuel cell is decreased, the power of the charged capacitance component of the fuel cell starts to be discharged to an external load, whereby it is an investigation theme to appropriately suppress an amount of the power to be generated by the fuel cell so that the power supplied from the fuel cell to the external load does not exceed the demanded power.

Such an investigation theme occurs in common at a time when a normal operation is switched to the low-efficiency operation and a time when the output voltage of the fuel cell is decreased, for example, at system stop.

To solve the problem, an object of the present invention is to suggest a fuel cell system which controls a cell operation in consideration of discharge from a capacitance component of a fuel cell to an external load when decreasing the output voltage of the fuel cell.

To achieve the above object, a fuel cell system according to the present invention comprises a fuel cell which receives a fuel gas and an oxidation gas to generate a power; an oxidation gas supply device which supplies the oxidation gas to the fuel cell; and a controller which reduces the oxidation gas flow rate supplied from the oxidation gas supply device to the fuel cell in consideration of discharge from a capacitance component of the fuel cell when decreasing the output voltage of the fuel cell.

When the output voltage of the fuel cell is decreased, the discharge from the capacitance component of the fuel cell to an external load occurs, whereby when the supply of the oxidation gas to the fuel cell is decreased in consideration of such discharge, the power supplied from the fuel cell to the external load can match a power demanded by the external load.

Here, the capacitance component of the fuel cell is a capacitance component of an electric double layer parasitically formed on an interface between a catalyst layer and an electrolytic film in the fuel cell.

The fuel cell system according to the present invention further comprises a bypass device which bypasses the fuel cell to discharge a part of the oxidation gas supplied from the oxidation gas supply device. The bypass device regulates a bypass flow rate of the oxidation gas when decreasing the output voltage of the fuel cell, to decrease the flow rate of the oxidation gas supplied to the fuel cell.

When the oxidation gas supply device is used for a large flow rate, and has flow rate characteristics that it is difficult to stably supply the gas with a small flow rate, it is difficult to regulate the flow rate of the oxidation gas to the fuel cell so that the power generation of the fuel cell is appropriately suppressed during voltage decrease processing. However, according to the above constitution, the flow rate of bypass air flowing through the bypass device can be regulated to appropriately suppress the power generation of the fuel cell so that the power supplied from the fuel cell to the external load during the voltage decrease processing matches the power demanded by the external load.

Moreover, in a case where the oxidation gas supply device is used for the large flow rate, and has the flow rate characteristics that it is difficult to stably supply the gas with the small flow rate, when the oxidation gas is supplied from the oxidation gas supply device to the fuel cell for a purpose of the generation of the power matching the demanded power after completing the voltage decrease processing, the oxidation gas more than necessary is supplied to the fuel cell, and an excessive power might be generated. However, according to the above constitution, in addition to the driving control of the oxidation gas supply device, the flow rate of the bypass air flowing through the bypass device can be regulated to stably supply the oxidation gas matching the demanded power to the fuel cell.

On the other hand, when the oxidation gas supply device is used for a small flow rate, and has flow rate characteristics that it is possible to stably supply the gas with the small flow rate, the flow rate of the oxidation gas supplied to the fuel cell can minutely be regulated so that the power supplied from the fuel cell to the external load during the voltage decrease processing matches the power demanded by the external load, and it is additionally possible to stably supply the oxidation gas matching the demanded power to the fuel cell after completing the voltage decrease processing. In such a case, the controller may stop the supply of the oxidation gas from the oxidation gas supply device to the fuel cell when decreasing the output voltage of the fuel cell.

Examples of the case where the output voltage of the fuel cell is decreased include (1) a case where the output voltage of the fuel cell is increased to charge the capacitance component of the fuel cell with the excessive power generated during operation at a low power generation efficiency as compared to a normal operation, and the output voltage of the fuel cell is decreased in a stage in which the charging of the capacitance component with the excessive power is completed; and (2) a case where the output voltage of the fuel cell is decreased to not more than a voltage value determined by a current-voltage characteristic curve of the fuel cell during warm-up of the fuel cell by the operation at the low power generation efficiency as compared to the normal operation.

BEST MODE FOR CARRYING OUT THE INVENTION

Figure 1:
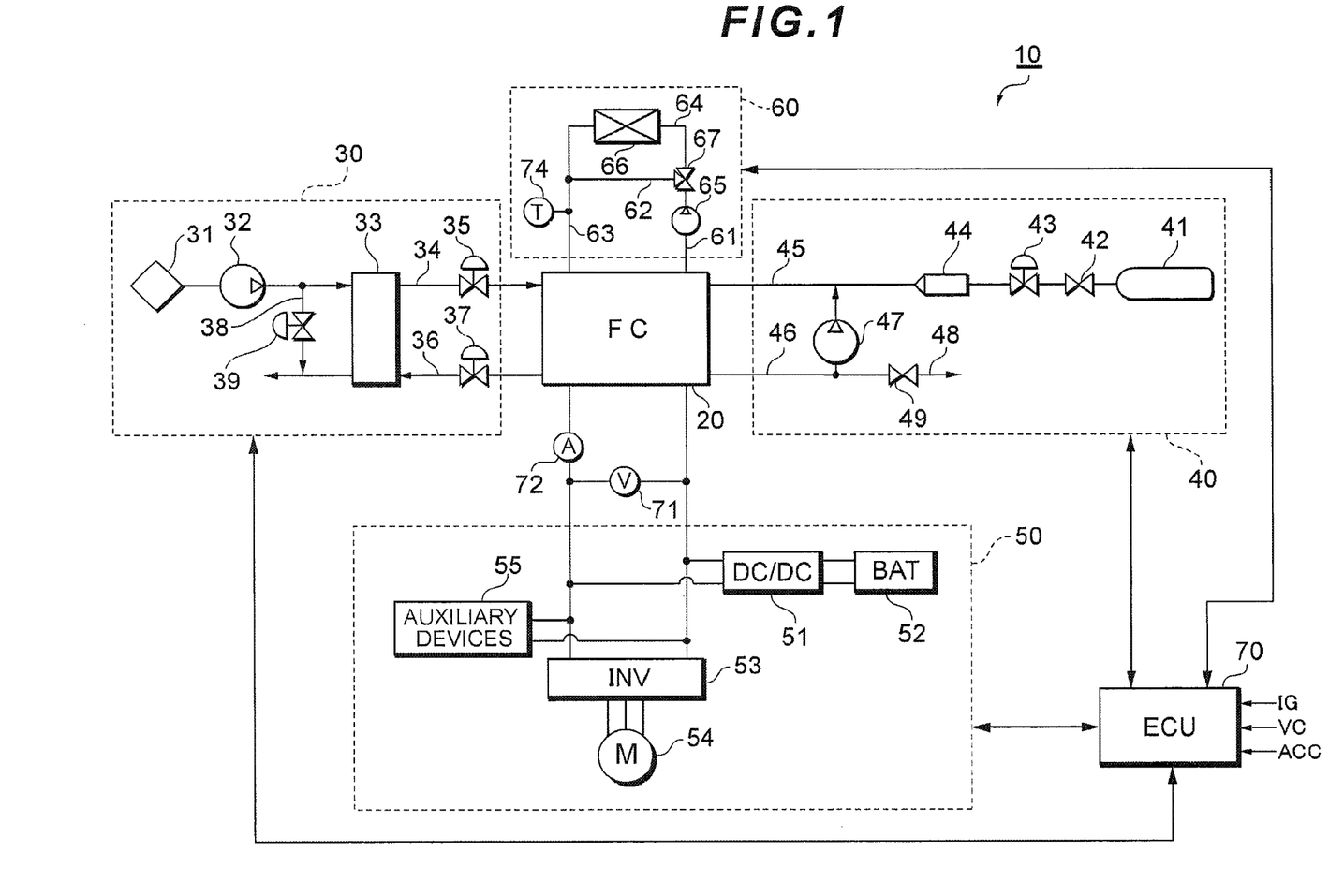
FIG. 1 is a system constitution diagram of a fuel cell system according to the present embodiment.

Hereinafter, an embodiment according to the present invention will be described with reference to the drawings.
FIG. 1 shows a system constitution of a fuel cell system 10 according to the present embodiment.

The fuel cell system 10 functions as a car-mounted power source system mounted on a fuel cell vehicle, and includes a fuel cell stack 20 which receives supply of a reactant gas (a fuel gas, an oxidation gas) for generation; an oxidation gas supply system 30 for supplying air as the oxidation gas to the fuel cell stack 20; a fuel gas supply system 40 for supplying a hydrogen gas as the fuel gas to the fuel cell stack 20; a power system 50 for controlling charging/discharging of the power; a cooling system 60 for cooling the fuel cell stack 20; and a controller (ECU) 70 which controls the whole system.

The fuel cell stack 20 is a solid polymer electrolytic cell stack in which a plurality of cells are laminated in series. In the fuel cell stack 20, an oxidizing reaction of formula (1) occurs in an anode pole, and a reducing reaction of formula (2) occurs in a cathode pole. In the whole fuel cell stack 20, an electromotive reaction of formula (3) occurs.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

To the fuel cell stack 20 are attached a voltage sensor 71 for detecting an output voltage of the fuel cell stack 20 and a current sensor 72 for detecting a power generation current.

The oxidation gas supply system 30 has an oxidation gas passage 34 through which the oxidation gas to be supplied to the cathode pole of the fuel cell stack 20 flows, and an oxidizing off gas passage 36 through which an oxidizing off gas discharged from the fuel cell stack 20 flows. The oxidation gas passage 34 is provided with an air compressor 32 which takes the oxidation gas from the atmosphere through a filter 31, a humidifier 33 which humidifies the oxidation gas to be supplied to the cathode pole of the fuel cell stack 20, and a throttle valve 35 for regulating an amount of the oxidation gas to be supplied. The oxidizing off gas passage 36 is provided with a back pressure adjustment valve 37 for regulating an oxidation gas supply pressure, and the humidifier 33 which performs water content exchange between the oxidation gas (a dry gas) and the oxidizing off gas (a wet gas).

Between the oxidation gas passage 34 and the oxidizing off gas passage 36 are arranged a bypass passage 38 which bypasses the fuel cell stack 20 to connect both the passages to each other and a bypass valve 39 which regulates the flow rate of the oxidation gas flowing through the bypass passage 38. The bypass valve 39 is usually closed, and is opened during voltage decrease processing described later. The bypass passage 38 and the bypass valve 39 function as bypass devices for regulating a bypass air flow rate.

The fuel gas supply system 40 has a fuel gas supply source 41; a fuel gas passage 45 through which the fuel gas to be supplied from the fuel gas supply source 41 to the anode pole of the fuel cell stack 20 flows; a circulation passage 46 for returning, to the fuel gas passage 45, a fuel off gas discharged from the fuel cell stack 20; a circulation pump 47 which feeds, to the fuel gas passage 43, the fuel, off gas under pressure in the circulation passage 46; and a gas/water discharge passage 48 branched from and connected to the circulation passage 47.

The fuel gas supply source 41 is constituted of, for example, a high-pressure hydrogen tank, a hydrogen occluded alloy or the like, and receives the hydrogen gas with a high pressure (e.g., 35 MPa to 70 MPa). When a block valve 42 is opened, the fuel gas is discharged from the fuel gas supply source 41 to the fuel gas passage 45. The pressure of the fuel gas is decreased to, for example, about 200 kPa by a regulator 43 and an injector 44, to supply the gas to the fuel cell stack 20.

It is to be noted that the fuel gas supply source 41 may be constituted of a reformer which forms a hydrogen-rich reformed gas from a hydrocarbon-based fuel, and a high-pressure gas tank which brings the reformed gas formed by this reformer into a high-pressure state to accumulate the pressure.

The regulator 43 is a device which adjusts the upstream pressure (the primary pressure) of the regulator into a preset secondary pressure, and is constituted of, for example, a mechanical pressure reduction valve or the like which decreases the primary pressure. The mechanical pressure reduction valve has a housing provided with a back pressure chamber and a pressure adjustment chamber formed via a diaphragm, and has a constitution in which the primary pressure is decreased to a predetermined pressure by the back pressure of the back pressure chamber to form the secondary pressure in the pressure adjustment chamber.

The injector 44 is an electromagnetic driving type opening/closing valve in which a valve body is directly driven with an electromagnetic driving force for a predetermined driving period and detached from a valve seat, whereby a gas flow rate or a gas pressure can be regulated. The injector 44 includes the valve seat having jet holes which jet a gas fuel such as the fuel gas, and also includes a nozzle body which supplies and guides the gas fuel to the jet holes, and the valve body movably received and held in an axial direction (a gas flow direction) with respect to this nozzle body to open or close the jet holes.

The gas/water discharge passage 48 is provided with a gas/water discharge valve 49. The gas/water discharge valve 49 operates in accordance with a command from the controller 70 to discharge, from the system, the fuel off gas including impurities in the circulation passage 46 and a water content. When the gas/water discharge valve 49 is opened, the concentration of the impurities in the fuel off gas of the circulation passage 46 lowers, and a hydrogen concentration in the fuel off gas to be circulated through a circulation system can be raised.

The fuel off gas discharged through the gas/water discharge valve 49 is mixed with the oxidizing off gas flowing through the oxidizing off gas passage 34, and diluted by a diluter (not shown). The circulation pump 47 is driven by a motor to circulate and supply the fuel off gas of the circulation system to the fuel cell stack 20.

The power system 50 includes a DC/DC converter 51, a battery 52, a traction inverter 53, a traction motor 54 and auxiliary devices 55. The DC/DC converter 51 has a function of raising a direct-current voltage supplied from the battery 52 to output the voltage to the traction inverter 53 and a function of lowering a direct-current power generated by the fuel cell stack 20 or a regenerative power collected by the traction motor 54 by regenerative braking to charge the battery 52. The charging/discharging of the battery 52 is controlled by these functions of the DC/DC converter 51. Moreover, an operation point (the output voltage, an output current) of the fuel cell stack 20 is controlled by voltage conversion control of the DC/DC converter 51.

The battery 52 functions as a storage source of an excessive power, a regenerative energy storage source during the regenerative braking, or an energy buffer during load fluctuation accompanying acceleration or deceleration of the fuel cell vehicle. As the battery 52, for example, a nickel/cadmium accumulator battery, a nickel/hydrogen accumulator battery, or a secondary battery such as a lithium secondary battery is preferable.

The traction inverter 53 is, for example, a PWM inverter driven by a pulse width modulation system, and converts the direct-current voltage output from the fuel cell stack 20 or the battery 52 into a three-phase alternate-current voltage in accordance with a control instruction from the controller 70 to control a rotary torque of the traction motor 54. The traction motor 54 is, for example, a three-phase alternate-current motor, and constitutes a power source of the fuel cell vehicle.

The auxiliary devices 55 generically include motors arranged in units of the fuel cell system 10 (e.g., power sources for pumps and the like), inverters for driving these motors, and any type of car-mounted auxiliary device (e.g., an air compressor, an injector, a cooling water circulation pump, a radiator or the like).

The cooling system 60 includes refrigerant passages 61, 62, 63 and 64 for circulating a refrigerant through the fuel cell stack 20; a circulation pump 65 for feeding the refrigerant under pressure; a radiator 66 for performing heat exchange between the refrigerant and outside air; a three-way valve 67 for switching a circulation path of the refrigerant; and a temperature sensor 74 for detecting a refrigerant temperature. During a normal operation after completing a warm-up operation, the opening/closing of the three-way valve 67 is controlled so that the refrigerant discharged from the fuel cell stack 20 flows through the refrigerant passages 61, 64, is cooled by the radiator 66, and then flows through the refrigerant passage 63 to flow into the fuel cell stack 20 again. On the other hand, during the warm-up operation immediately after system startup, the opening/closing of the three-way valve 67 is controlled so that the refrigerant discharged from the fuel cell stack 20 flows through the refrigerant passages 61, 62 and 63 to flow into the fuel cell stack 20 again.

The controller 70 is a computer system including a CPU, an ROM, an RAM, an input/output interface and the like, and functions as a control device for controlling the units (the oxidation gas supply system 30, the fuel gas supply system 40, the power system 50 and the cooling system 60) of the fuel cell system 10. For example, on receiving a startup signal IG output from an ignition switch, the controller 70 starts the operation of the fuel cell system 10 to obtain a demanded power of the whole system based on an accelerator open degree signal ACC output from an accelerator sensor, a vehicle speed signal VC output from a vehicle speed sensor and the like.

The demanded power of the whole system is a total value of a vehicle running power and an auxiliary device power. The auxiliary device power includes a power consumed by a car-mounted auxiliary device (the humidifier, the air compressor, the hydrogen pump, the cooling water circulation pump or the like), a power consumed by a device (a change gear, a wheel control device, a steering device, a suspension device or the like) necessary for vehicle running, a power consumed by a device arranged in a passenger space (an air conditioner, a light fixture, an audio or the like) and the like.

Moreover, the controller 70 determines distribution of the output powers of the fuel cell stack 20 and the battery 52, calculates a generation instruction value, and controls the oxidation gas supply system 30 and the fuel gas supply system 40 so that the amount of the power to be generated by the fuel cell stack 20 matches a target power. Furthermore, the controller 70 controls the DC/DC converter 51 to regulate the output voltage of the fuel cell stack 20, thereby controlling the operation point (the output voltage, the output current) of the fuel cell stack 20. To obtain the target vehicle speed corresponding to an accelerator open degree, the controller 70 outputs, for example, U-phase, V-phase and W-phase alternate-current voltage instruction values as switching instructions to the traction inverter 53, and controls an output torque and a rotation number of the traction motor 54.

Figure 2:
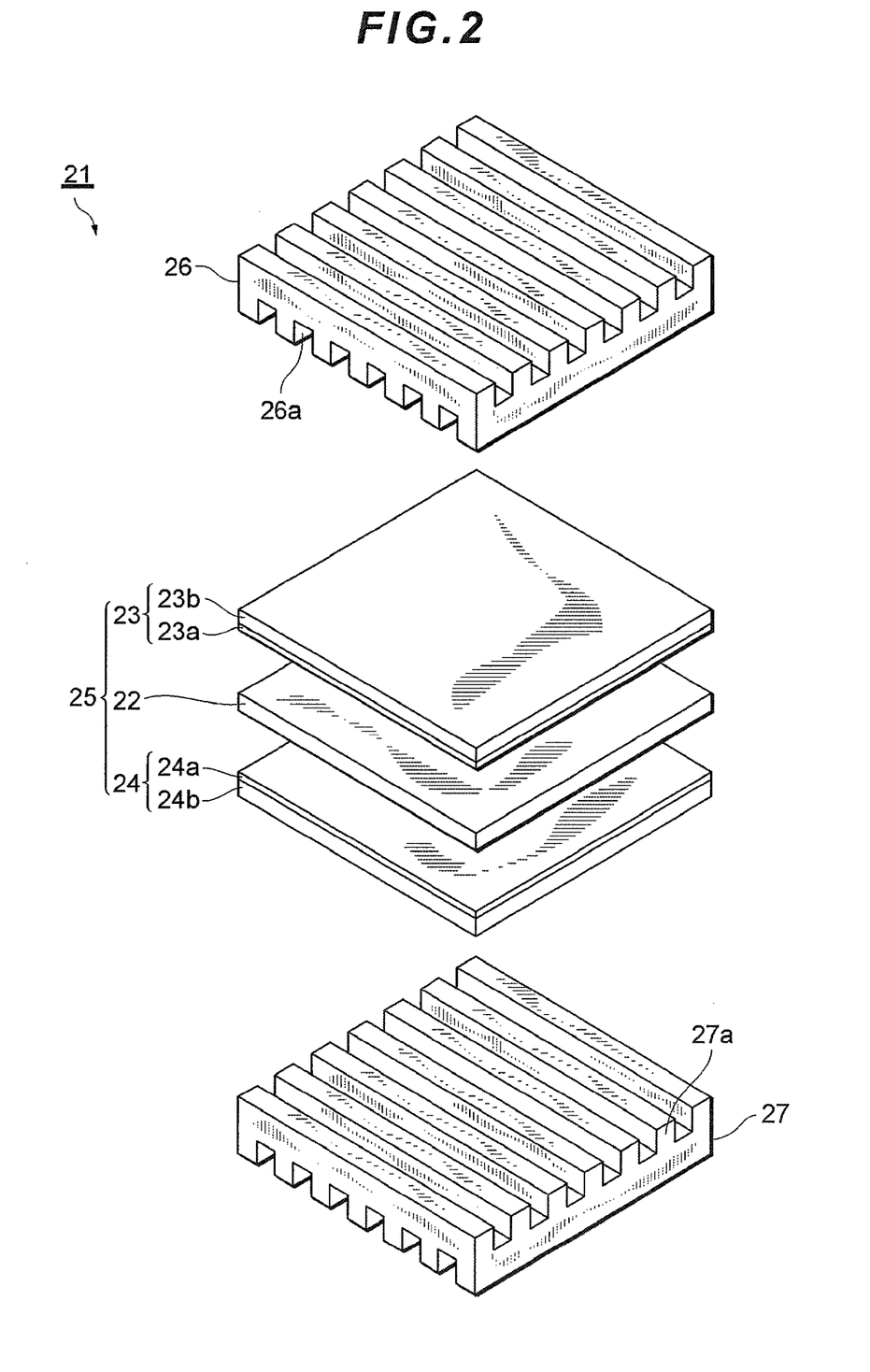
FIG. 2 is an exploded perspective view of a cell.

FIG. 2 is an exploded perspective view of a cell 21 constituting the fuel cell stack 20.

The cell 21 is constituted of an electrolytic film 22, an anode pole 23, a cathode pole 24, and separators 26, 27. The anode pole 23 and the cathode pole 24 are diffusion electrodes which sandwich the electrolytic film 22 from both sides to constitute a sandwich structure. The separators 26, 27 constituted of gas impermeable conductive members further sandwich this sandwich structure from both sides, while forming the passages of the fuel gas and the oxidation gas between the anode pole 23 and the cathode pole 24. The separator 26 is provided with ribs 26a having recessed sections. The anode pole 23 abuts on the ribs 26a to close openings of the ribs 26a, thereby forming a fuel gas passage. The separator 27 is provided with ribs 27a having recessed sections. The cathode pole 24 abuts on the ribs 27a to close openings of the ribs 27a, thereby forming an oxidation gas passage.

The anode pole 23 has a catalyst layer 23a including carbon powder carrying a platinum-based metal catalyst (Pt, Pt—Fe, Pt—Cr, Pt—Ni, Pt—Ru or the like) as a main component, the catalyst layer coming in contact with the electrolytic film 22; and a gas diffusion layer 23b formed on the surface of the catalyst layer 23a and having both gas permeability and electron conductivity. Similarly, the cathode pole 24 has a catalyst layer 24a and a gas diffusion layer 24b. More specifically, as to the catalyst layers 23a, 24a, the carbon powder carrying platinum or an alloy made of platinum and another metal is dispersed in an appropriate organic solvent, and an electrolytic solution is added as much as an appropriate amount, pasted and screen-printed on the electrolytic film 22. The gas diffusion layers 23b, 24b are formed of carbon cloth woven with a thread constituted of a carbon fiber, carbon paper or carbon felt. The electrolytic film 22 is a proton conductive ion exchange membrane formed of a solid polymer material, for example, a fluorine-based resin, and exerts satisfactory electric conductivity in a wet state. The electrolytic film 22, the anode pole 23 and the cathode pole 24 form a membrane-electrode assembly 25.

Figure 3:
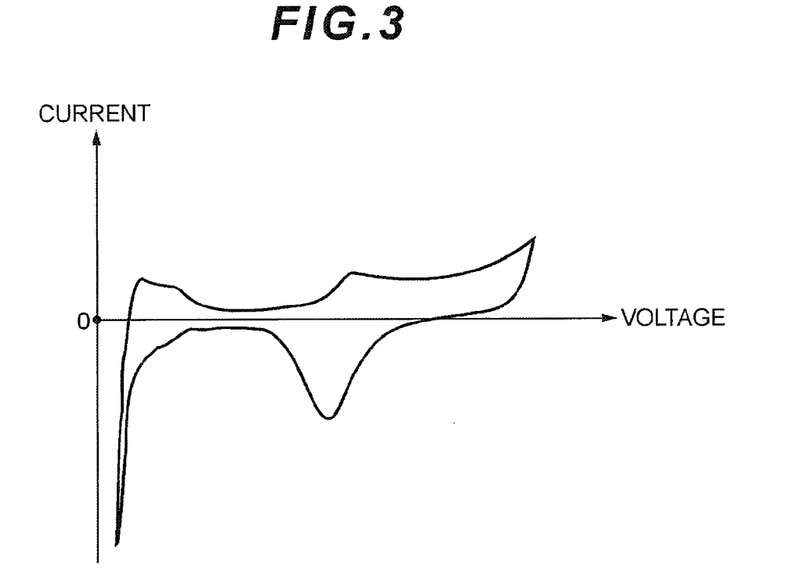
FIG. 3 is a C-V characteristic diagram of a fuel cell stack.

FIG. 3 shows C-V characteristics (a cyclic voltammogram) of the fuel cell stack 20.

The C-V characteristics show dynamic electric characteristics of the fuel cell stack 20. When the voltage of the fuel cell stack 20 is increased at a fixed voltage rise ratio, a current flows in a direction from the outside to the fuel cell stack 20 (a minus direction). When the voltage of the fuel cell stack is decreased at a fixed voltage drop ratio, the current flows in a direction from the fuel cell stack 20 to the outside (a plus direction). It has been found that such dynamic electric characteristics are obtained by a capacitance component parasitically disposed in the fuel cell stack 20.

Referring to FIG. 2 again, electrons and hydrogen ions concerned with the electrochemical reaction represented by the above formulas (1) and (2) gather together on an interface between the electrolytic film 22 and the catalyst layer 23a and an interface between the electrolytic film 22 and the catalyst layer 24a, to form an electric double layer. The voltage generated by the electrons and hydrogen ions which have gathered together on the electric double layer is consumed as an energy source for activating the hydrogen gas and an oxygen gas in a ground state, respectively, and hence the voltage is generally referred to as an activating overvoltage. It is known that the electric double layer formed on the above interfaces functions as an electric energy storage source and that the dynamic electric characteristics of the layer are equivalent to those of a capacitor.

When the power generation current is suddenly increased or decreased, the lowering of an ohm voltage due to an ohm resistance of the electrolytic film 22 follows the change of the power generation current with good response properties, but the activating overvoltage generated in the electric double layer cannot follow the change of the power generation current with the good response properties, and slowly settles into an equilibrium state over a certain degree of time. A reason why such a difference is generated is that the electric characteristics of the electrolytic film 22 can be modeled as a resistance element, whereas the electric characteristics of the electric double layer can be modeled as the capacitor.

Figure 4:
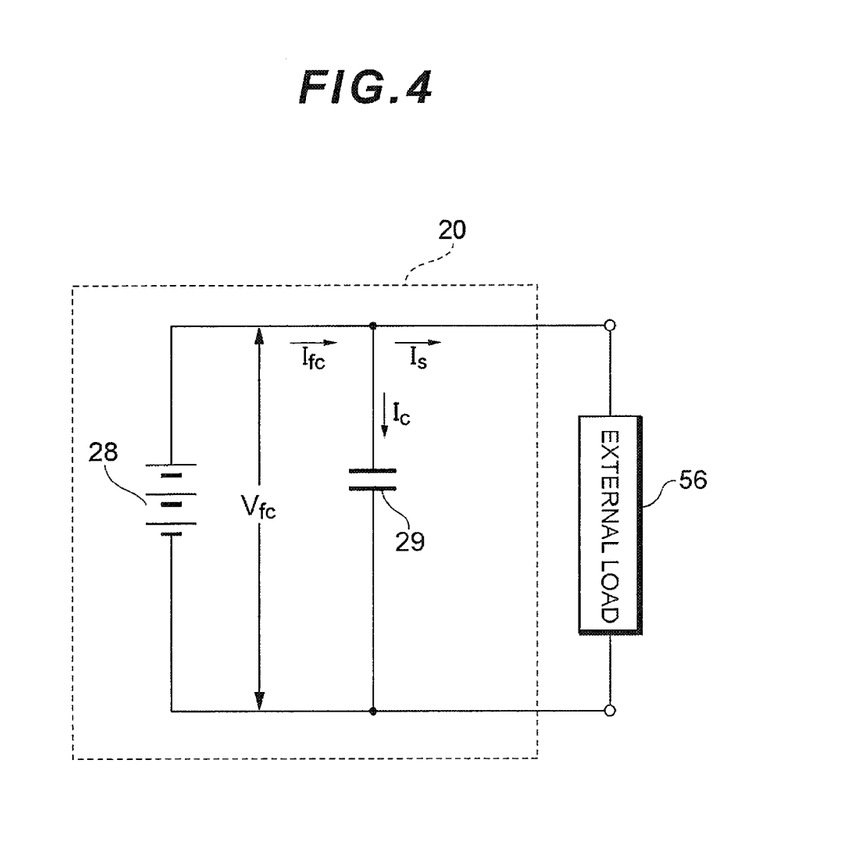
FIG. 4 is an equivalent circuit diagram of the fuel cell stack.

FIG. 4 is an equivalent circuit diagram in which the dynamic electric characteristics of the fuel cell stack 20 are modeled.

The fuel cell stack 20 has a circuit constitution in which an ideal fuel cell 28 and a capacitor 29 are connected in parallel. The ideal fuel cell 28 models a virtual fuel cell which does not have the above C-V characteristics, and performs a behavior equivalent to that of a variable power source from a viewpoint of the electric characteristics. The capacitor 29 models the electric behavior of the electric double layer formed on the above interfaces as a capacity element. An external load 56 is an equivalent circuit which models the power system 50. When the current discharged from the ideal fuel cell 28 is Ifc, the output voltage of the ideal fuel cell 28 (the output voltage of the fuel cell stack 20) is Vfc, the current flowing into the capacitor 29 is Ic, the current discharged from the fuel cell stack 20 to the external load 56 is Is, the capacity of the capacitor 29 is C, and time is t, the following equations (4) and (5) are established.

$$Ifc = Ic + Is \quad (4)$$

$$Ic = C \times \Delta Vfc / \Delta t \quad (5)$$

As shown in the equations (4) and (5), when the output voltage Vfc rises, the current Ic flowing into the capacitor 29 increases in accordance with a change amount $\Delta Vfc/\Delta t$ per unit time, and hence the current Is discharged from the fuel cell stack 20 to the external load 56 decreases. On the other hand, when the output voltage Vfc lowers, the current Ic flowing into the capacitor 29 decreases in accordance with the change amount $\Delta Vfc/\Delta t$ per unit time, and hence the current Is discharged from the fuel cell stack 20 to the external load 56 increases. The voltage rising/lowering amount of the output voltage Vfc per unit time can be controlled in this manner to adjust the current Is discharged from the fuel cell stack 20 to the external load 56 (hereinafter referred to as the $\Delta V$ control for the sake of convenience).

As an application example of the $\Delta V$ control, there is a method for controlling the output voltage Vfc to absorb the excessive power by the capacitor 29, when the power generation request to the fuel cell stack 20 rapidly decreases during, for example, the low-efficiency operation. The low-efficiency operation is an operation for setting an air stoichiometric ratio to a value less than 1.0 and controlling the amount of the reactant gas to be supplied to the fuel cell stack 20, to increase a power loss, thereby operating the system at a low power generation efficiency. The air stoichiometric ratio is an oxygen surplus ratio indicating a degree of surplus of supplied oxygen with respect to oxygen necessary for reacting with hydrogen without any excess or deficiency. When the air stoichiometric ratio is set to a small value to perform the low-efficiency operation, a concentration overvoltage becomes larger than that during the normal operation, and hence the thermal loss (power loss) of the energy which can be taken by a reaction between hydrogen and oxygen increases.

The low-efficiency operation is performed as, for example, means for intentionally increasing the thermal loss during startup at a low temperature (during the startup at a stack temperature of a predetermined temperature or less) to quickly warm up the fuel cell stack 20, in a startup preparatory stage before running the vehicle or during a warm-up operation while running the vehicle.

While holding the amount of the fuel gas to be supplied to the fuel cell stack 20 at a fixed value and regulating the flow rate of the oxidation gas to the fuel cell stack 20 to obtain a desired power in accordance with an accelerator open degree, the low-efficiency operation while running the vehicle is performed until the stack temperature rises to the predetermined temperature (e.g., 0° C.), and the operation is switched to the normal operation when the stack temperature reaches the predetermined temperature.

Figure 5:
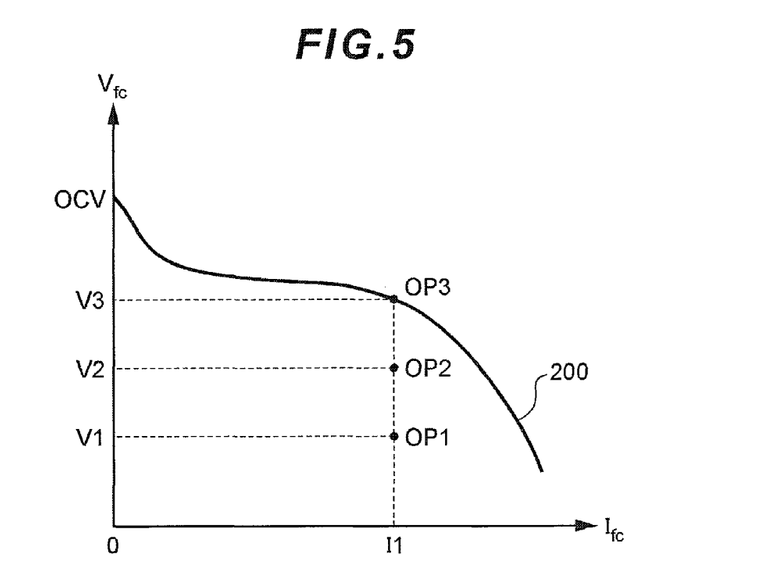
FIG. 5 is an explanatory view of an operation point of the fuel cell stack.

FIG. 5 shows the I-V characteristics of the fuel cell stack 20.

During the normal operation, to improve the power generation efficiency, the operation is controlled so that the operation point (the output current Ifc, the output voltage Vfc) is positioned on an I-V characteristic curve (a current-voltage characteristic curve) 200. On the other hand, during the low-efficiency operation, the power generation efficiency is intentionally lowered to decrease the thermal loss, so that the operation point is set to a voltage point lower than the I-V characteristic curve 200, for example, the output voltage Vfc=V1. V1 is preferably, for example, about ½ of an open end voltage OCV of the fuel cell stack 20. By the low-efficiency operation, since the output voltage Vfc is fixed to V1, the flow rate of the oxidation gas supplied from the air compressor 32 to the fuel cell stack 20 is controlled to regulate the output current Ifc, and the power generation control is performed in accordance with an operation load (e.g., the accelerator open degree).

For example, the operation point at a time when the warm-up operation is performed while running the vehicle by the low-efficiency operation is OP1 (I1, V1). Even when an operator turns off an accelerator to rapidly decrease the generation instruction value for the fuel cell stack 20, the air compressor 32 is not provided with a speed reducer such as a brake, cannot rapidly decrease a rotation number of the compressor, and continues rotating with a rotation number slightly larger than that matching the generation instruction value for a while. Then, the excessive power corresponding to a difference between the amount of the power to be generated by the fuel cell stack 20 and the generation instruction value is generated. When the output voltage Vfc is increased from V1 to V2 by the ΔV control (at this time, the operation point moves from OP1 to OP2), the capacitor 29 parasitically present in the fuel cell stack 20 can be charged with this excessive power, so that the power value supplied from the fuel cell stack 20 to the external load 56 can substantially match the generation instruction value.

After charging the capacitor 29 with the excessive power, the output voltage Vfc is decreased from V2 to V1 to return the operation point from OP2 to OP1. At this time, the power of the charged capacitor 29 is discharged to the external load 56 with the drop of the output voltage Vfc, whereby the power generation of the fuel cell stack 20 needs to be suppressed so that the power supplied from the fuel cell stack 20 to the external load 56 (the sum of the power generated by the fuel cell stack 20 and the power discharged from the capacitor 29) matches the power demanded by the external load 56.

To solve the problem, the supply of the oxidation gas from the air compressor 32 to the fuel cell stack 20 is decreased to a stable limit flow rate (the minimum flow rate with which the air can be supplied in such a range capable of securing flow rate stability or response properties in a low rotation region), and further the valve open degree of the bypass valve 39 is regulated to reduce the supply of the oxidation gas to the fuel cell stack 20 to the stable limit flow rate or less.

In a case where the capacity of the air compressor 32 is a large capacity, it is difficult to reduce the flow rate of the oxidation gas supplied to the fuel cell stack 20 to the stable limit flow rate or less so that the power supplied from the fuel cell stack 20 to the external load 56 during the voltage decrease processing matches the power demanded by the external load 56, but according to the above constitution, the flow rate of the bypass air flowing through the bypass passage 38 can be regulated to reduce the flow rate of the oxidation gas supplied to the fuel cell stack 20 to the stable limit flow rate or less.

After completing the voltage decrease processing, the rotation number of the air compressor 32 and the valve open degree of the bypass valve 39 are regulated so as to supply the oxidation gas matching the demanded power to the fuel cell stack 20. When the capacity of the air compressor 32 is a large capacity and the air compressor 32 is driven for a purpose of the generation of the power matching the demanded power after completing the voltage decrease processing, the oxidation gas more than necessary is supplied to the fuel cell stack 20, and the excessive power might be generated. However, according to the above constitution, in addition to the driving control of the air compressor 32, the flow rate of the bypass air flowing through the bypass passage 38 can be regulated to stably supply the oxidation gas matching the demanded power to the fuel cell stack 20.

It is to be noted that in a case where the air compressor 32 has a small capacity, the flow rate of the air supplied to the fuel cell stack 20 can minutely be regulated so that the power supplied from the fuel cell stack 20 to the external load 56 during the voltage decrease processing matches the power demanded by the external load 56 and the oxidation gas matching the demanded power can stably be supplied to the fuel cell stack 20 after completing the voltage decrease processing, the bypass passage 38 is not required. Further in such a case, the driving of the air compressor 32 may be stopped during the voltage decrease processing.

It is to be noted that an operation point OP3 (I1, V3) positioned on the I-V characteristic curve 200 indicates that the maximum voltage which can theoretically be output from the fuel cell stack 20 at the output current I1 is V3. A range in which the output voltage Vfc can be increased by the ΔV control while keeping the output current Ifc at I1 during the low-efficiency operation at the operation point OP1 is limited to a range of OP1 to OP3. Therefore, when a voltage rise in excess of (V3-V1) is instructed, the operation point of the I-V characteristic curve 200 corresponding to the instructed voltage value is a new operation point.

Figure 6:
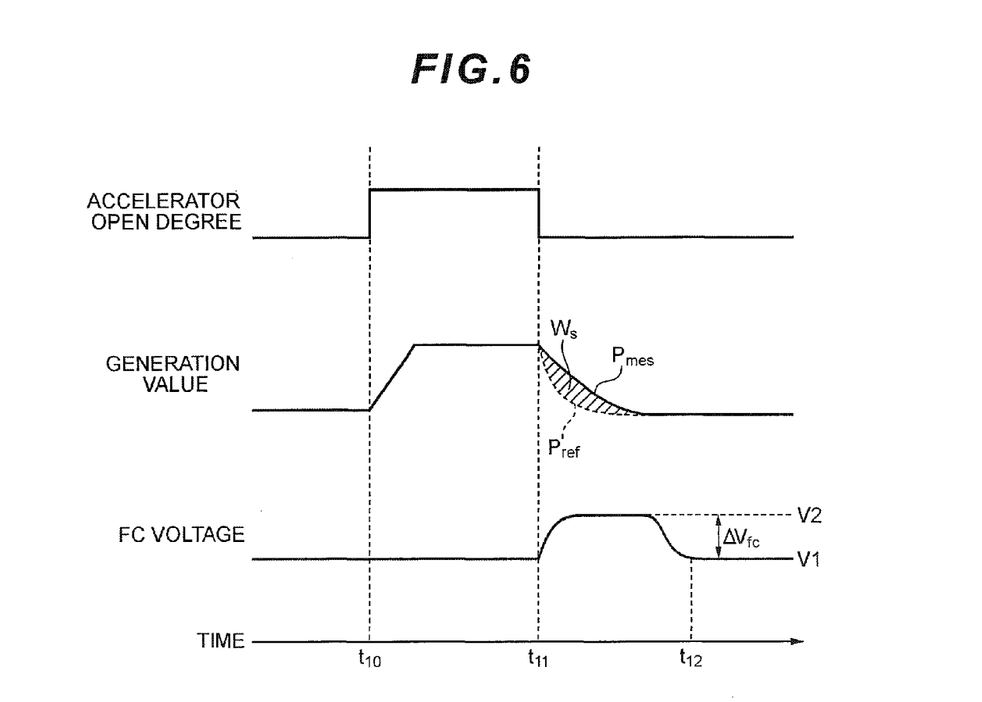
FIG. 6 is a timing chart showing a control process of ΔV control.

FIG. 6 is a timing chart showing a control process of the ΔV control.

As an example in which the power generation request for the fuel cell stack 20 rapidly decreases, there will be assumed a case where a state in which the accelerator is on is kept for a period from time t10 to time t11 and the accelerator turns off at the time t11, and the ΔV control will be described.

At the time t11 when the accelerator turns off, the operation load of the fuel cell stack 20 (specifically, the power required for the vehicle running) decreases, and hence the controller 70 calculates a generation instruction value Pref so as to generate the power matching the decrease of the operation load. At this time, the power to be supplied to car-mounted auxiliary devices may be generated, and hence the generation instruction value Pref gradually decreases. The operation point at the time t11 is OP1 (I1, V1).

However, since the air compressor 32 is not provided with a speed reducer such as the brake, the rotation of the air compressor cannot immediately be restricted even when the accelerator turns off at the time t11, the air compressor inertially continues rotating for a while, and the amount of the oxidation gas larger than the oxidation gas supply amount matching the generation instruction value Pref is supplied to the fuel cell stack 20. Therefore, a generation amount Pmes of the fuel cell stack 20 becomes larger than the generation instruction value Pref, and a difference Ws between the generation amount and the generation instruction value is the excessive power.

The DC/DC converter 51 increases the output voltage Vfc of the fuel cell stack 20 as much as ΔVfc=(V2-V1), and sets the operation point to OP2 (I1, V2). Then, the capacitance component in the fuel cell stack 20, that is, the capacitor 29 is charged with the excessive power Ws, and hence a power (Pmes-Ws) output from the fuel cell stack 20 substantially matches the generation instruction value Pref.

At time t12 when the charging of the capacitor 29 with the excessive power Ws is completed, the output voltage Vfc is decreased as much as ΔVfc=(V2-V1), and the operation point returns from OP2 (I1, V2) to OP1 (I1, V1). At this time, the supply of the oxidation gas from the air compressor 32 to the fuel cell stack 20 is decreased to the stable limit flow rate, and the valve open degree of the bypass valve 39 is further regulated to suppress the power generation of the fuel cell stack 20. When the air compressor 32 has a small capacity and the oxidation gas matching the demanded power can stably be supplied to the fuel cell stack 20 after completing the voltage decrease processing, the rotation of the air compressor 32 may be stopped during the voltage decrease processing. After the operation point returns to OP1, the rotation number of the air compressor 32 is controlled so as to supply the oxidation gas matching the demanded power to the fuel cell stack 20.

It is to be noted that as one example of the voltage decrease processing, processing of decreasing the output voltage Vfc increased so as to absorb the excessive power Ws has been illustrated, but in addition, the above control can be applied even to, for example, a case where during the startup at the low temperature, the output voltage Vfc is decreased from the open end voltage OCV to the voltage value of a desired operation point to perform the low-efficiency operation.

As described above, when the supply of the oxidation gas to the fuel cell stack 20 is decreased in consideration of the discharge from the capacitor 29 to the external load 56 when decreasing the output voltage Vfc of the fuel cell stack 20, the power supplied from the fuel cell stack 20 to the external load 56 can match the power demanded by the external load 56.

In the above embodiment, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source of a mobile body (a robot, a ship, an airplane or the like) other than the fuel cell vehicle. Moreover, the fuel cell system 10 according to the present embodiment may be used as a power generation facility (a stational power generation system) of a housing, a building or the like.

INDUSTRIAL APPLICABILITY

According to the present invention, a cell operation can be controlled in consideration of discharge from a capacitance component of a fuel cell to an external load when decreasing the output voltage of the fuel cell.

The invention claimed is:

1. A fuel cell system comprising:
a fuel cell which receives a fuel gas and an oxidation gas to generate a power;
an oxidation gas supply device which supplies the oxidation gas to the fuel cell; and
a controller which reduces the oxidation gas flow rate supplied from the oxidation gas supply device to the fuel cell in consideration of discharge from a capacitance component of the fuel cell when decreasing the output voltage of the fuel cell.

2. The fuel cell system according to claim 1, further comprising:
a bypass device which bypasses the fuel cell to discharge a part of the oxidation gas supplied from the oxidation gas supply device,
wherein the bypass device regulates a bypass flow rate of the oxidation gas when decreasing the output voltage of the fuel cell, to decrease the flow rate of the oxidation gas supplied to the fuel cell.

3. The fuel cell system according to claim 1, wherein the controller stops the supply of the oxidation gas from the oxidation gas supply device to the fuel cell when decreasing the output voltage.

4. The fuel cell system according to claim 1, wherein the controller increases the output voltage to charge the capacitance component with an excessive power generated during operation at a low power generation efficiency as compared to a normal operation, and decreases the output voltage in a stage in which the charging of the capacitance component with the excessive power is completed.

5. The fuel cell system according to claim 1, wherein the controller decreases the output voltage to not more than a voltage value determined by a current-voltage characteristic curve of the fuel cell during warm-up of the fuel cell by operation at a low power generation efficiency as compared to a normal operation.

6. The fuel cell system according to claim 1, wherein the capacitance component is a capacitance component of an electric double layer parasitically formed on an interface between a catalyst layer and an electrolytic film in the fuel cell.

* * * * *